United States Patent
Weyh et al.

(10) Patent No.: US 6,636,351 B2
(45) Date of Patent: Oct. 21, 2003

(54) PROCESS FOR CONTROLLING A LASER SCANNING MICROSCOPE WITH A TILTABLE FINE FOCUSING STAGE

(75) Inventors: Thomas Weyh, Stadtroda (DE); Ulrich Simon, Rothenstein (DE); Sebastian Tille, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/274,095

(22) Filed: Mar. 22, 1999

(65) Prior Publication Data

US 2003/0043457 A1 Mar. 6, 2003

(30) Foreign Application Priority Data

Jul. 4, 1998 (DE) .......................................... 198 29 982

(51) Int. Cl.⁷ .......................... G02B 21/06; G02B 21/00
(52) U.S. Cl. ....................... 359/368; 359/383; 359/391; 250/458.1
(58) Field of Search .................................. 359/393, 383, 359/368, 385, 391, 392; 250/559.39, 559.04–559.06, 548, 234–236, 458.1, 459.1, 461.1, 461.2; 356/317–318, 417

(56) References Cited

U.S. PATENT DOCUMENTS 5,656,812 A * 8/1997 Takahashi ................... 250/310

* cited by examiner

Primary Examiner—Thong Nguyen
(74) Attorney, Agent, or Firm—Reed Smith LLP (57) ABSTRACT

A process for displaying three-dimensional point distributions in a laser scanning microscope with a tiltable fine focusing stage, wherein an actual scanned first raster point distribution is compared with a computer-generated second raster point distribution, and the first raster points are utilized for display in the second raster point distribution when the raster points in both distributions correspond with one another, while intermediate values are formed from points of the first raster point distribution lying in the vicinity of second raster points when there is no correspondence, wherein the position of these intermediate values corresponds to the position of the second raster points, or a displacement of the X/Y-scanner of the microscope and/or of the stage tilting means is carried out in a particularly advantageous manner with reference to a computer-determined two- or three-dimensional raster point distribution in such a way that the scanned raster points in and/or on an object correspond completely or partially to a predetermined, preferably stored raster point distribution. A tiltable fine focusing stage is also disclosed.

5 Claims, 7 Drawing Sheets

FIG. 1B
PRIOR ART

Raster in Object

FIG. 1A
PRIOR ART

Cuboid Raster

PROCESS FOR CONTROLLING A LASER SCANNING MICROSCOPE WITH A TILTABLE FINE FOCUSING STAGE

BACKGROUND OF THE INVENTION a) Field of the Invention

The invention is directed to a laser scanning microscope for providing three-dimensional and, more particularly, a process for controlling a laser scanning microscope with a tiltable fine focusing stage.

b) Description of the Related Art

A compact microscope stage for fine focusing is known from DE 19650392.

Further, a fast and highly precise fine focusing of an object in the direction of the optical axis z is made possible by a fine focusing stage comprising a frame, wherein a tongue which is connected with the frame on one side via a solid hinge or joint and is adjusted in the desired z-position on the other side with a high-precision galvanometer scanner moves in the frame.

The angular movement of the scanner is transmitted to the stage tongue via pulling means which run along the shaft of the scanner. The stage tongue and consequently the object held at the latter are accordingly tilted or rotated about the axis of the solid joint in the course of the fine focusing movement and are therefore adjusted at an angle ≠90° to the optical axis. As a result of this tilting movement, a lateral offsetΔr of the object occurs in the xy-plane, this lateral offset having a significant magnitude particularly when, as is usually the case in practice, the object is not located exactly in the plane in which the axis of rotation of the stage tongue is situated. The axis of rotation A of the stage tongue is always oriented vertical to the optical axis as is shown in the figures Formerly, a cable was always used as pulling means for transmitting the scanner movement to the stage tongue (DE 19650392). This involves numerous disadvantages: The cable is generally formed of several twisted wires because a single wire is either not flexible enough (too thick) or has insufficient loading capacity (too thin). When the cable which is tensioned by the force of gravity of the tongue and by the spring force of the spring joints runs along the scanning axis, these individual wires are alternately untwisted and then twisted together again. This causes a change in the length of the cable which transfers directly to the stage tongue. The precision and reproducibility with which the stage tongue can be adjusted in a desired position is accordingly lastingly impaired. Moreover, significant reverse backlash occurs which further impairs precision. The loading capacity of a cable of this kind is likewise very limited. Therefore, a stage of the type mentioned above is actually unsuitable in practice for fine focusing in the sub-100 nm range for which it was in fact designed.

A three-dimensional (3D) image which is recorded with a confocal laser scanning microscope (CLSM) is generally formed of a quantity (stack) of xy-sectional planes which are scanned in a pointwise manner and are drawn in successively in positions along the z-axis which succeed one another in a stepwise manner. The xy-raster of the individual sectional planes is generated in that a laser beam is deflected on the individual image points by means of a beam deflection system (e.g., by means of two galvanometer scanners). This raster is the same for all planes of the stack. The z-raster is generated in that the object is displaced in a parallel manner along the z-axis.

Figure 1A:
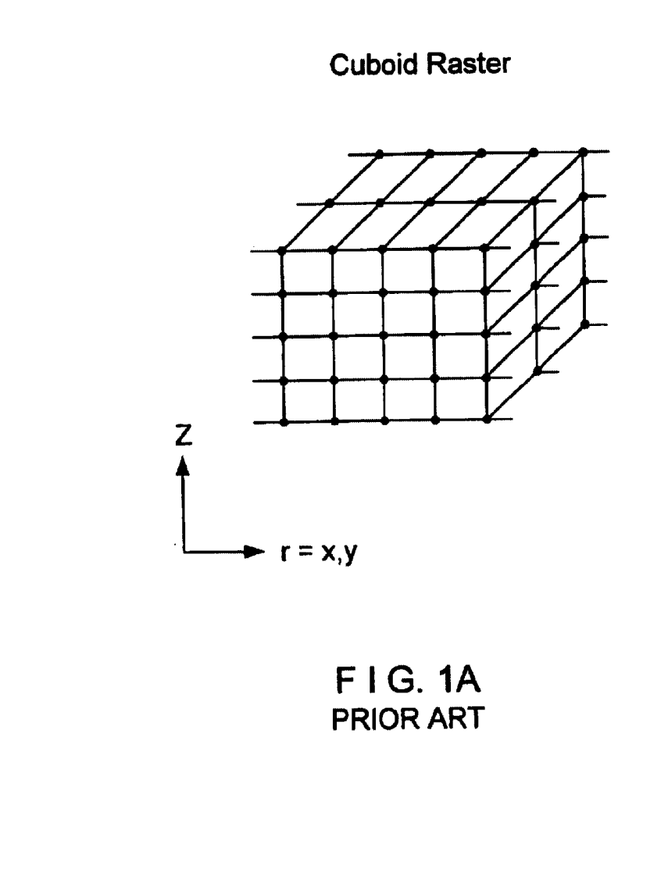
FIG. 1a illustrates a cuboid raster of a confocal laser scanning microscope (CLSM)

The computer-assisted image processing system of the CLSM arranges the image points belonging to the individual sectional planes one above the other in parallel manner, i.e., in a cuboid raster, in order to reconstruct the 3D image therefrom. The cuboid raster is shown in FIG. 1a. In this respect, it is required that all actual sectional planes in the object (1) extend exactly parallel to one another and (2) are arranged one exactly above the other along the z-axis. If these prerequisites are met, the image reconstructed by the computer is a real 1:1 mapping. However, this is only the case when the z-movement of the object is carried out along the optical axis.

Figure 1B:
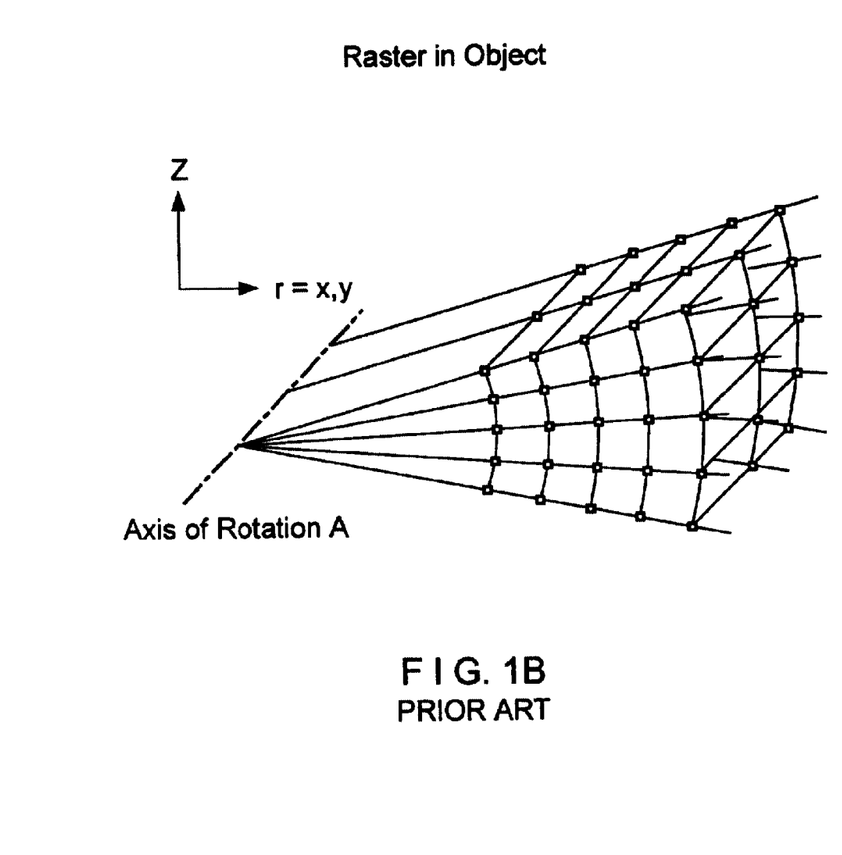
FIG. 1b illustrates a raster where Z movement of the object occurs with respect to the optical axis which is carried out on a circular segment.

On the other hand, if a z-stage with a galvanometer-controlled tilting tongue is used in the recording of the 3D image, these prerequisites are no longer met. Because of the tilting of the tongue, (1) the individual sectional planes are not parallel to one another and, due to the lateral offset which is a function of z, (2) they do not lie one above the other. The z-movement of the object with respect to the optical axis is carried out on a circular segment (FIG. 1b). The raster in the object (image field) is accordingly not a cuboid raster. In order to examine the deviations from the cuboid raster, it is sufficient to consider a plane which is oriented parallel to the optical axis. A plane E1 of this kind from the object raster and a plane E2 from the cuboid raster were placed one on top of the other in FIG. 2 in order to make the deviations visible.

Figure 2:
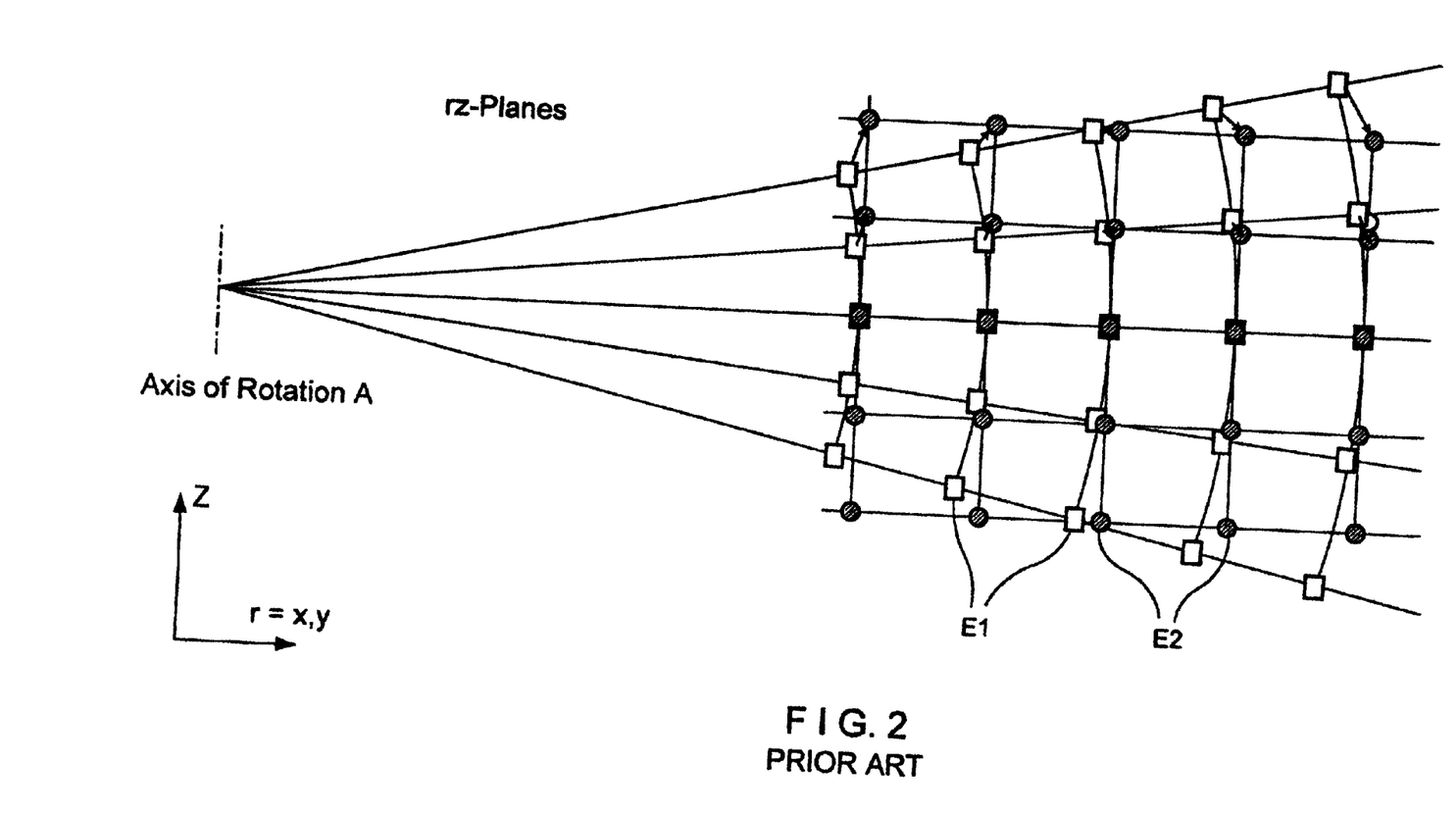
FIG. 2 illustrates a reconstructed 3D image of the scanned object which results in distortion.

If the 3D image of the scanned object is reconstructed by the computer in the conventional manner of the CLSM, the correlation of the raster points from the object of plane E1 to the cuboid raster of plane E2 is carried out in accordance with an algorithm shown by the arrows in FIG. 2. However, the 1:1 mapping is therefore no longer given. An unadvantageous distortion of the real image takes place through the transformation of the raster.

OBJECT AND SUMMARY OF THE INVENTION

The primary object of the invention is the provision of a highly precise and distortion-free three-dimensional scanning by means of a laser scanning microscope.

In accordance with the invention, a fine focusing stage for a laser scanning microscope comprises a motor-adjustable or galvanometer-adjustable tilting tongue, wherein the tilting tongue is articulated at an adjusting portion by at least one flexible tape which is sturdy with respect to tension and is made from glass fiber-reinforced plastic.

Further in accordance with the invention, a process for displaying three-dimensional point distributions in a laser scanning microscope with a tiltable fine focusing stage comprising the steps of comparing an actual scanned first raster point distribution with a computer-generated second raster point distribution, utilizing the first raster points for display in the second raster point distribution when the raster points in both distributions correspond with one another, and forming intermediate values from points of the first raster point distribution lying in the vicinity of second raster points when there is no correspondence, wherein the position of these intermediate values corresponds to the position of the second raster points.

The use of a flexible tape in accordance with the invention obviates the disadvantages of cable discussed above.

DESCRIPTION OF THE PREFERRED EMBODIMENTS

Figure 6:
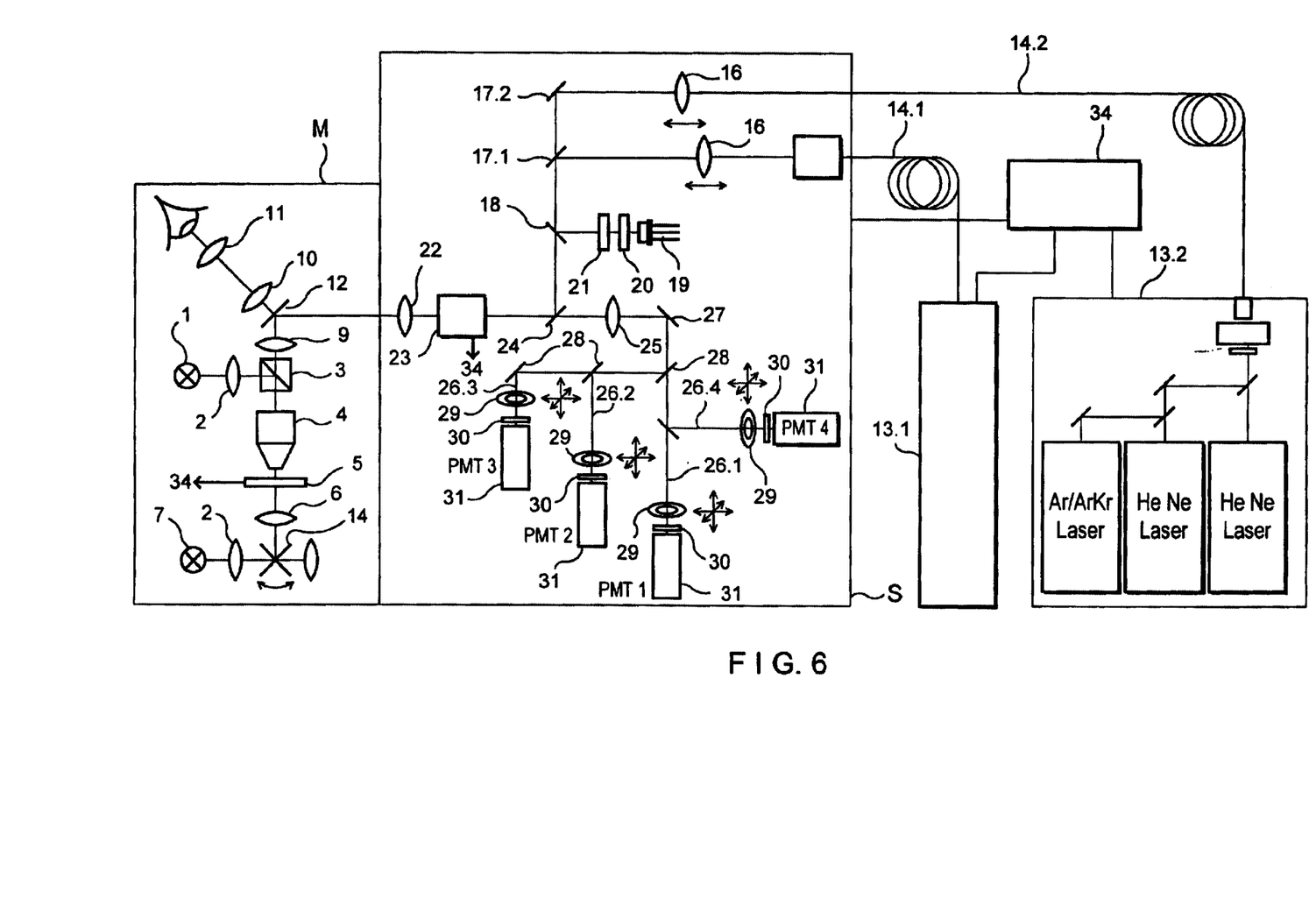
FIG. 6 illustrates in schematic form a laser scanning microscope having a microscope unit M and scan head S.

A microscope unit M and a scan head S which have a common optical interface via an intermediate imaging and form a LSM are shown schematically in FIG. 6. The scan head S can be mounted on the phototube of an upright microscope as well as on a lateral output of an inverse microscope.

The drawings show a microscope beam path which is switchable between incident light scanning and transmitted light scanning by means of a swivelable mirror 14, with a light source 1, illumination optics 2, beam splitter 3, objective 4, specimen stage 5, condenser 6, light source 7, receiver arrangement 8, a first tube lens 9, an observation beam path with a second tube lens 10 and an eyepiece 11, and a beam splitter 12 for coupling in the scanning beam. A laser module 13.1, 13.2 holds the laser and is connected via monomode light-conducting fibers 14.1, 14.2 with the laser input coupling unit of the scan head S.

The coupling into the light-conducting fibers 14.1, 14.2 is carried out by displaceable collimating optics 16 and beam deflecting elements 17.1, 17.2. A monitoring beam path is stopped down by means of a partially reflecting mirror 18 in the direction of a monitor diode 19, wherein line filters 21 and neutral filters 20 are advantageously arranged in front of the monitor diode 19 on a rotatable filter wheel, not shown.

The actual scan unit comprises a scanning objective 22, X/Y scanner 23, main beam splitter 24 and common imaging optics 25 for detection channels 26.1–26.4.

A deflecting prism 27 arranged behind the imaging optics 25 reflects the radiation coming from the object in the direction of dichroic beam splitters 28 in the convergent beam path of the imaging optics 25, wherein pinholes 29 which are displaceable in the direction of and vertical to the optical axis and which are adjustable in diameter are arranged along with emission filters 30 and suitable receiver elements 31 (PMT) individually for each detection channel following the beam splitters 28. A control unit/computer unit 34 is connected, among others, with the stage 5 and the scanners 23 and controls them.

Figure 7:
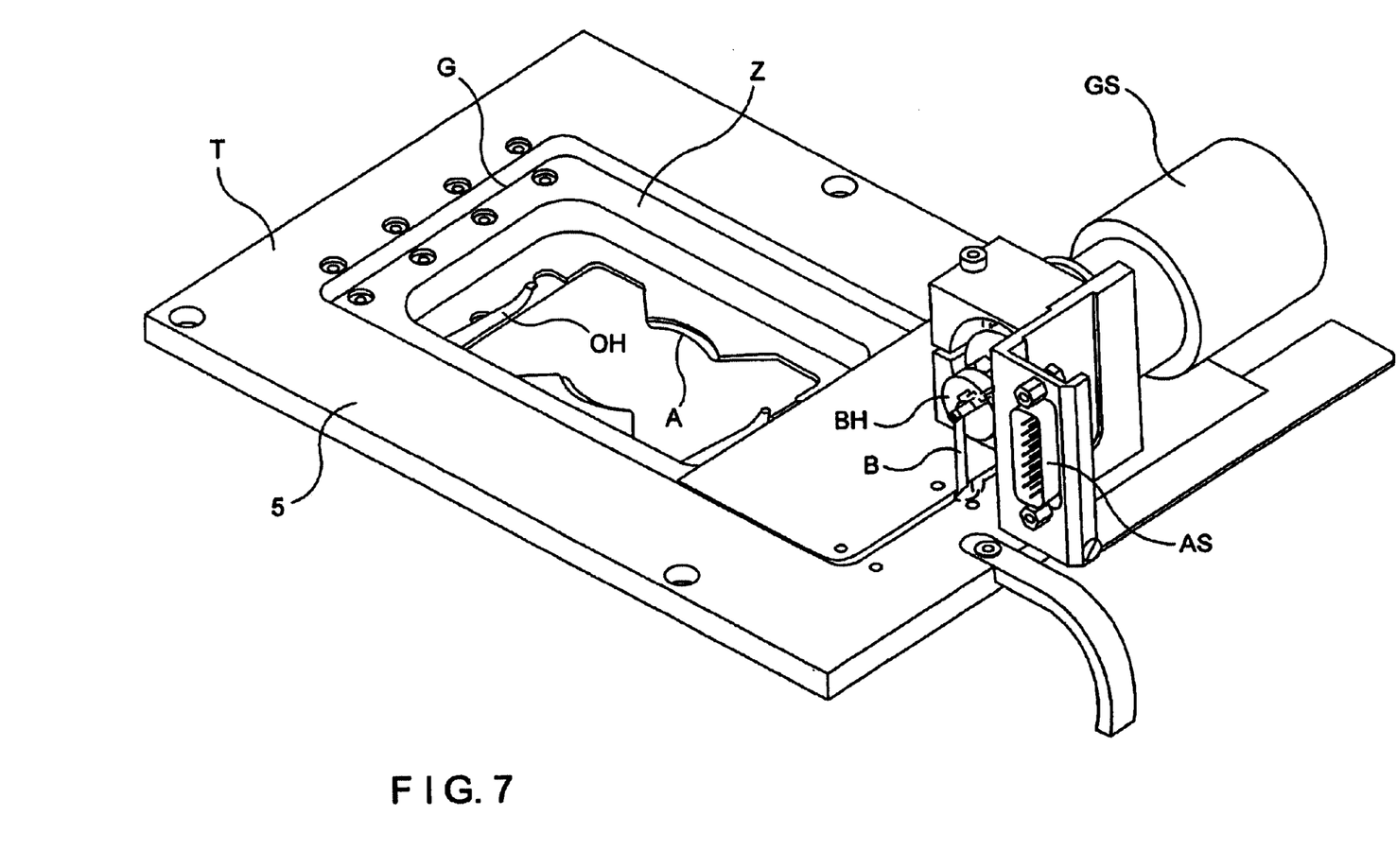
FIG. 7 illustrates in perspective view a fine focusing stage in accordance with the invention.

FIG. 7 shows the fine focusing stage 5 according to the invention. A tongue Z is held in a stage holder T by means of a joint G at one side and, at the other side, at a tape which is resistant to alternating bending loads and has a constant length B.

In an advantageous manner, a tape is used instead of a cable in a tiltable fine focusing stage. This tape can be constructed, for example, from high-grade steel, copper-beryllium, glass fiber-reinforced plastic or carbon fiber-reinforced plastic. It has been demonstrated through laboratory experiments with a tape having a thickness of 0.2 mm and a width of 3 mm that the aforementioned disadvantages no longer occur (i.e., a precision of 30 nm and individual steps and reverse backlash of less than 10 nm were achieved, which was impossible with a cable.

The tape is fastened to a tape holder BH which is rotatable by means of the shaft (not shown) of a galvanometer scanner GS. The running of the tape B along the shaft of the tape holder is accordingly translated during a rotation of the scanner shaft into a vertical movement of the tongue Z which causes a vertical movement of the object which is held in a recess A, for example, for a Petri dish, by means of object holder OH. The scanner is controlled via an electrical connection AS which is connected with the control unit 34.

Further, according to the invention, processes are suggested which ensure the 1:1 imaging even when using a z-stage with galvanometer-controlled tilting tongue.

1) The inclination of the tongue $(90°-\theta)$ and the resulting lateral offset $\Delta r$ of a scanned point (see FIG. 3) can be determined and stored for every raster point in the object (xyz) during the recording of images. For this purpose, there are two possibilities according to the invention: a) Inclination and lateral offset are calculated from the driving voltage of the scanner to which a defined rotation of the shaft can be assigned and from the known geometric dimensions (diameter of the shafts and distances); b) Inclination and lateral offset can likewise be determined with a. separate measurement system. Subsequently, the 3D image field actually scanned in the object is reconstructed by the computer from this data by means of an image processing program. Image information is presented and further processed basically only in the form of the real object raster shown at left in FIG. 1.

Figure 3:
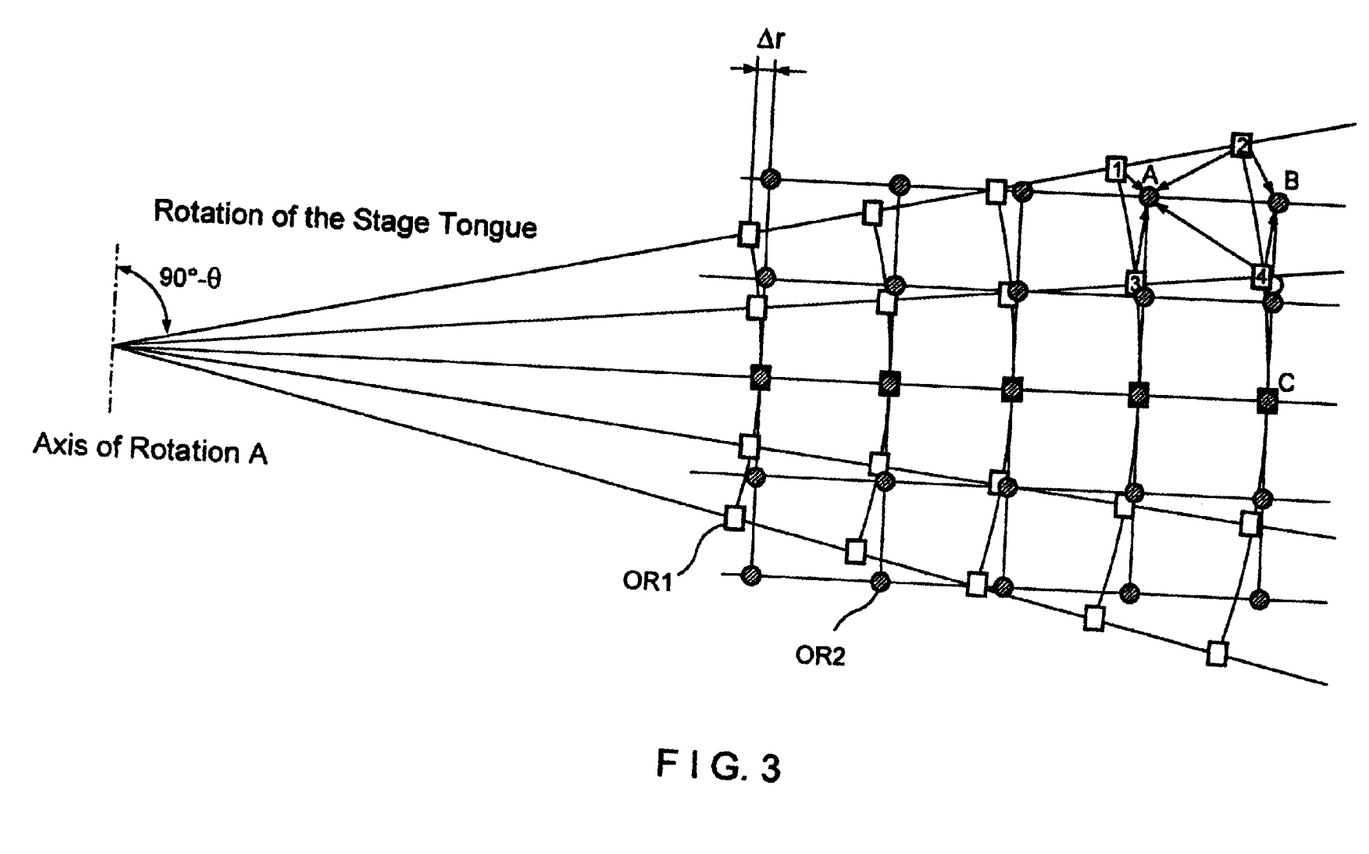
FIG. 3 illustrates use of an artificially generated cuboid raster and, in accordance with the invention, its use in remapping the object raster.

However, there is a large amount of data to be stored which must be processed by computer. It is both more vivid and simpler with respect to computing technique to use a cuboid raster for representing the 3D image field. The real object raster OR1 is therefore projected onto a cuboid raster OR2 which is artificially generated by the computer. As is shown in FIG. 3, raster points from the object raster which coincide with those from the cuboid raster are retained, i.e., the image information of these points is taken over in a 1:1 ratio (e.g., point C). The image information of other points of the cuboid raster (such as A and B) which are not contained in the object raster is obtained by interpolation or extrapolation from the image information of the respective adjacent points in the object raster. This is illustrated by the arrows in FIG. 3. Raster point A is determined from the image information of points 1, 2, 3 and 4 in the object raster, raster point B is determined from 2 and 4. The image information of points 1, 2, 3 and 4 (2 and 4) is weighted by the distance to point A (B) in order to obtain its image information.

Figure 4:
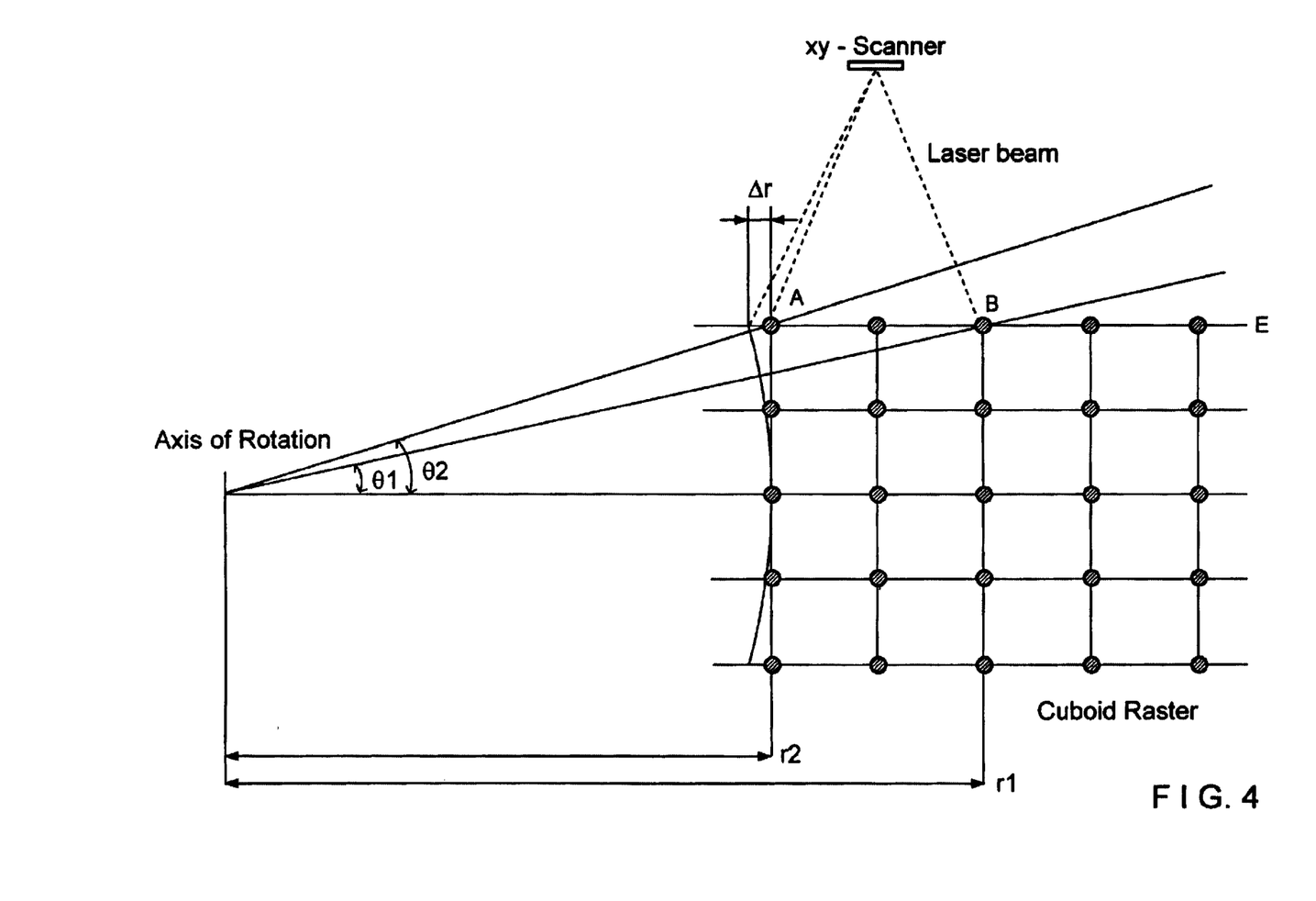
FIG. 4 illustrates a process in accordance with the invention using a 3D cuboid raster built of sectional planes.

2) The computing effort described above in 1) can be obviated when a 3D cuboid raster built of sectional planes which are parallel and lie exactly one above the other is always scanned in the object. According to the invention, a z-stage with galvanometer-controlled tilting tongue-is used. In this way, it is possible to quickly scan the object in x, y and z. In this respect, none of the 3 coordinates has priority. This high degree of symmetry during the scanning of the object is made use of according to the invention. By means of advantageous synchronization of all 3 scanners, the image information is recorded only when the respective raster point in the object coincides With a raster point of the cuboid raster. For example, when a xy-plane is scanned (vertical to the optical axis z), the inclination θ (See FIG. 5) of the tongue is adapted to the respective distance r of this point from the axis of rotation A of the tongue, so that all raster points of every plane have this same z coordinate. FIG. 4 illustrates this procedure by the example of two points A and B which lie in a common plane E vertical to the optical axis z. As soon as the deflection of the laser beam with the xy-scanners is directed onto point B of raster OR2 which is initially only generated by the computer and present therein, the inclination of the stage tongue $\theta_1$ is adjusted with the z-scanner by means of an offset. On the other hand, when the laser beam hits point A, then synchronously therewith the inclination of the stage tongue $\theta_2$ is adjusted, etc. for all other points of every plane. The tongue is accordingly inclined more sharply the nearer the raster points in xy to the center of rotation of the tongue.

Moreover, every lateral offset Δr of an image point A situated in a scanned plane, which lateral offset Δr occurs in the course of the z-movement of the tongue or for other reasons, can be compensated in that the deflection of the laser beam in xy is corrected by exactly the amount-Δr. For this purpose, the offset of the x and y galvanometer scanner is correspondingly adjusted. Accordingly, by continuously adapting the xyz-deflectors (scanners) to one another with respect to raster point during the recording of a 3D image, a true cuboid raster OR1 is scanned in the object and is displayed without difficulty, according to the invention, by conventional methods of image processing and can be further processed because it exactly matches the cuboid raster OR2 which is predetermined by the computer with trivial assistance of the computer.

Figure 5:
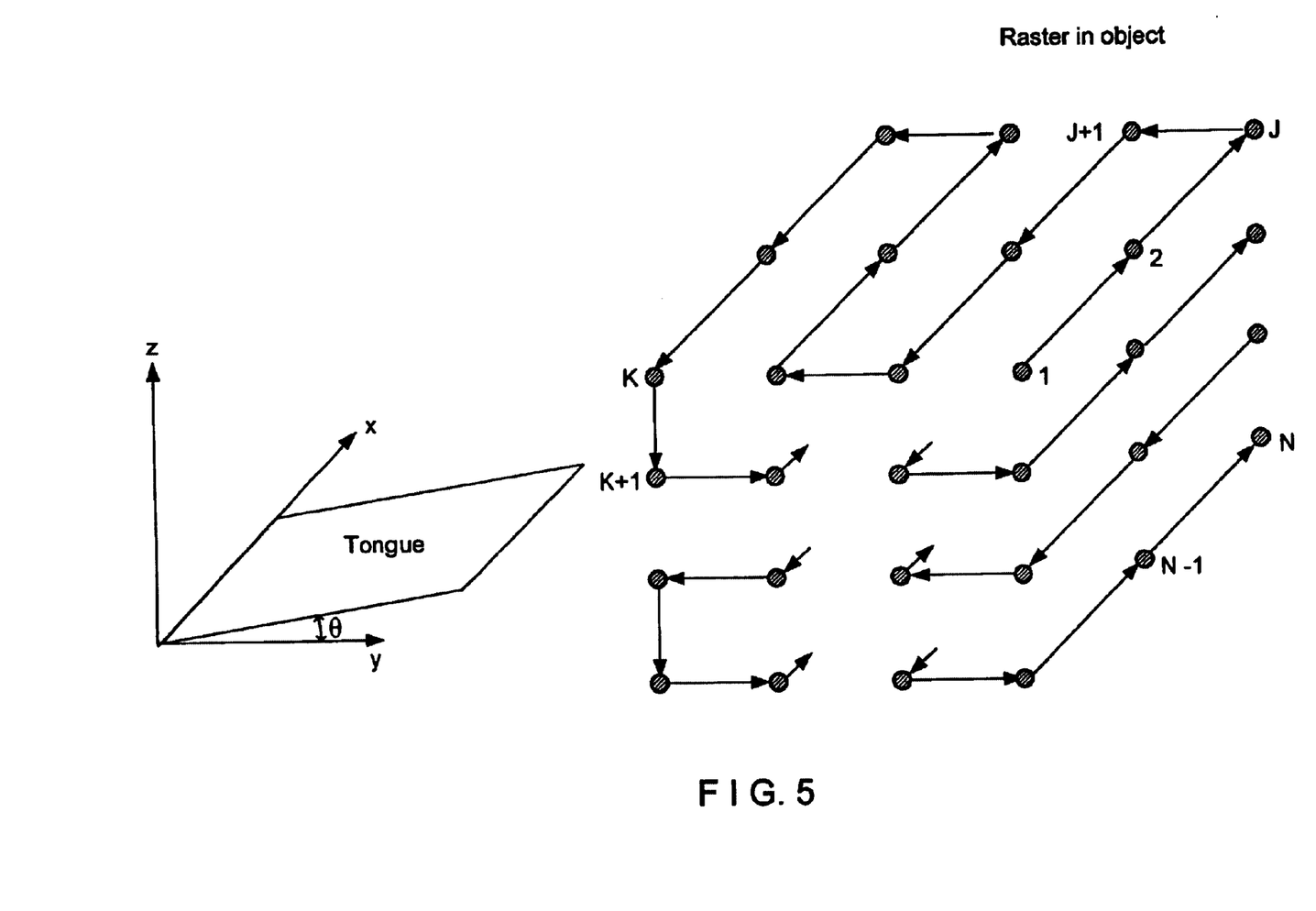
FIG. 5 illustrates a further process in accordance with the invention during the recording of a 3D cuboid.

According to the invention, the process shown in FIG. 5 during the recording of a 3D cuboid which is encountered very often in practice can advantageously be realized in the following manner: The axis of rotation A corresponds to the x-axis, the deflection of the laser beam along this axis is carried out with the x-galvanometer scanner. The beam is deflected along the y-axis with the y-scanner. The optical axis is z. The rotation of the stage tongue about the x-axis is carried out with the z-scanner, i.e., the stage tongue forms angle 74 with the y-axis and angle 90°−θ with the z axis.

Raster point 1 is given as starting point by the computer. The computer determines the inclination of the tongue q corresponding to this point in the object and the lateral offset Dy (Dx=b 0) from the 3 coordinates xyz of the point. The control voltages for the x-, y- and z-scanners are calculated from the latter and the scanners are deflected in a corresponding manner so that the laser beam impinges exactly on the required point in the object. Subsequently, the image information of this point is recorded.

The next raster point 2 has the same x-coordinate as point 1, both points are located on a line. Point 2 is reached in that the deflection of the x-scanner is changed, the deflection of the y- and z-scanners is retained. Subsequently, the image information of this point is recorded. The process is carried out in an analogous manner for the subsequent points 3 . . . J which all belong to this line. Following this, the next line, the next line after that, and so on, is scanned in an analogous manner.

When approaching the first point belonging to a line (e.g., J+1), the deflection of the y- and z-scanners is corrected in order to compensate again for the changed inclination and the changed lateral offset at this point, while the deflection of the x-scanner is retained. All of the lines, with corresponding image points, belonging to the uppermost plane are scanned at point K, point K+1 belongs to the next plane. When approaching the first point (e.g., K+1) belonging to a plane, the deflection of the y-scanner and z-scanner is corrected in order to compensate again for the changed inclination and the changed lateral offset at this point, while the deflection of the x-scanner is retained. Every new plane is again scanned line by line until the last image point N which belongs to the last line of the last plane. This sequence offers the advantage that it is always possible to proceed from one image point to the next with a minimum of deflections of the x-, y- and z-scanners.

Because of the symmetry of the scanning in the 3 coordinates xyz, it is not compulsory to adhere to this prescription; any algorithms of the scanner control/sequence can be realized during the scanning of a predetermined raster. For example, the stack can likewise be formed from yz-planes, etc. In general, the deflections of the x-, y- and z-scanners are calculated and adjusted individually for every point of the raster before the image information is recorded.

It is not necessary that the scanners are at rest during the recording of the image information. The recording can be carried out during the movement of the scanners when a time window within which the image information is obtained is determined by the evaluating electronics. This time window then simultaneously determines the magnitude of the raster points in the object.

In accordance with the inventive process, the following advantages result:

1. It is now possible to record images of individual planes or lines which have a completely optional orientation in the xyz-space of the object.

2. An image stack need no longer compulsorily comprise individually scanned xy-planes which have been successively drawn in along the z-axis. Rather, it is now likewise possible to construct the stack from xz-planes or yz-planes which are successively drawn in along the y- or x-axis. In the most general case, the stack is formed of parallel planes which are oriented in any optional manner in the xyz-space. The successive inclusion of the image points of individual planes is then carried out along that axis which is oriented vertical to this optionally oriented plane.

3. Any optional individual raster points can be selected from a freely determinable raster in the object—preferably a cuboid raster—and scanned in a completely free sequence. The 3D image is then no longer constructed from individual planes, but rather from an optional quantity of individual image points in any sequence. Only these image points are shown within the raster (e.g., of the cuboid raster).

While the foregoing description and drawings represent the preferred embodiments of the present invention, it will be obvious to those skilled in the art that various changes and modifications may be made therein without departing from the true spirit and scope of the present invention:

What is claimed is:

1. A process for controlling a laser scanning microscope with a tiltable fine focusing stage to record a three-dimensional image of an object, comprising the steps of
carrying out displacements of an X/Y scanner of the microscope and a stage tilting means with reference to a computer-determined three dimensional raster point distribution; and
scanning raster points, wherein the step of carrying out displacements is performed so that the scanned raster points at varying depths of an interior of an object correspond at least partially to a predetermined, three dimensional stored raster point distribution.

2. A method of controlling a laser scanning microscope having an x-scanner, a y-scanner and a z-scanner coupled to a tiltable tongue that holds an object under study, comprising:

for each three dimensional raster scan point at varying depth of an interior of the object, adjusting a combination of the x-scanner, y-scanner and z-scanner such that the each three dimensional raster scan point corresponds to an associated cuboid raster point of the object, the z-scanner being operable to tilt the tiltable tongue; and scanning the each three dimensional raster scan point with a laser beam.

3. The method according to claim 2 wherein the step of adjusting the z-scanner includes controlling a galvanometer rotatably coupled to the tiltable tongue.

4. A method of controlling a laser scanning microscope having an x-scanner, a y-scanner and a z-scanner coupled to a tiltable tongue that holds an object under study, comprising:

for each three dimensional raster scan point at varying depth of an interior of the object, using a combination of the x-scanner, y-scanner and z-scanner to adjust the each three dimensional raster scan point to compensate for a lateral offset caused by angular rotation of the tiltable tongue, each adjusted scan point corresponding to an associated cuboid raster point of the object; and scanning the adjusted raster scan point with a laser beam.

5. A method of controlling a laser scanning microscope having an x-scanner, a y-scanner and a z-scanner coupled to a tiltable tongue that holds an object under study, comprising:

for each three dimensional raster scan point at varying depth of the object, adjusting a combination of the x-scanner, y-scanner and z-scanner such that the each three dimensional raster scan point corresponds to an associated cuboid raster point of the object, the z-scanner being operable to tilt the tiltable tongue, wherein the step of adjusting includes raising the object towards a laser beam as the each three dimensional raster scan point moves closer to the axis of rotation of the tiltable tongue; and scanning the each three dimensional raster scan point with a laser beam.

* * * * *